United States Patent Office 3,066,083
Patented Nov. 27, 1962

3,066,083
ELECTROLYZING SODIUM CHLORIDE
Hugh T. Reid, 13875 Lake Ave., Lakewood 7, Ohio
No Drawing. Filed Sept. 6, 1961, Ser. No. 136,188
5 Claims. (Cl. 204—68)

This invention relates to an improvement in process for electrolytically producing chlorine from sodium chloride, and more particularly in such process wherein the sodium chloride is in fused state.

In such process the electrolytic decomposition zone has an anode region and a cathode region, and frequently the cathode region is screened, or surrounded with other foraminous structure, to increase the electrical efficiency of the apparatus. My improvement in process comprises electrolyzing the fused salt in the presence of particulate active carbon at a temperature not substantially above about 900° C.

The presence of the active carbon appears to reduce the vapor pressure of sodium and to enhance the liberation of chlorine in the operation. Additionally, sodium appears to combine in some form with active carbon in the process, perhaps in a solution form, but at least partially in the form of a carbide decomposable with water to yield acetylene gas and caustic soda.

Of prime importance in the operation is the use of particulate activated carbon, e.g., that made from petroleum "acid sludge," coconut shell, sugar or other vegetable matter, pitches, etc.; lampblack and petroleum coke are sufficiently active for my purpose also. Graphite, metallurgical coke, and the like, appear to be inert and unsuitable.

The suitable activated carbon preferably is agglomerated in the form of 4–60 mesh (per inch) pellets or other particles for my purpose. In such condition it is simpler to handle amounts in excess of the stoichiometric for the reaction: $2NaCl + 2C \rightarrow Na_2C_2 + Cl_2$, which I have found desirable. Additionally, the presence of such particles in the melt does not materially affect its mobility and liquidity as does the usual ultrafine active carbon dust. Normally I use 2–6 times the stoichiometric carbon for the above reaction relative to sodium chloride.

The bath or melt temperature must be high enough to maintain the sodium chloride in the molten state. The sodium chloride can be used in pure, or virtually pure, condition if desired, but I prefer to add a melting temperature-lowering substance such as calcium chloride in order to operate at a lower temperature. Use of a lower temperature, advantageously 450–800° C. and preferably not above 600–700° C. should enhance the stability of sodium carbide formed and maintain a low vapor pressure of sodium in the operation.

While the electrolysis can be operated at atmospheric pressure or below, it is possible to, and probably advantageous to use superatmospheric pressures, where the equipment is designed to stand it, to suppress dissociation of sodium from carbon present. Because of practical equipment limitations, pressures above several hundred pounds per square inch are difficult to obtain, although higher pressures are certainly feasible.

In its simplest form the apparatus can be a pot holding the fused salt and active carbon, with two electrodes inserted into the molten mass suspending the carbon. Chlorine escapes the pot from the anode or positive electrode region when direct current is impressed. Putting the carbon in the spot where it will do its main job is, however, to concentrate it in the cathode region. A conventional electrolytic cell such as the McNitt cell can be used to advantage here, the carbon being maintained around the cathode by the screen element therearound and extending upwards into the sodium drawoff tube.

The following example shows how my invention has been practiced, but is not to be construed as limiting the invention. All temperatures are in degrees centigrade, and all parts are parts by weight, unless otherwise specified.

Example

Into a "Dixon" Brand graphite crucible there was charged 40 parts of activated carbon, 80 parts of calcium chloride, and 80 parts of sodium chloride. The activated carbon was Columbia Brand SXW4–6 mesh pellets compressed from active carbon that had been derived from acid sludge obtained in petroleum refining operations.

The reactor was heated at atmospheric pressure until the salts fused, and thereafter during the run the salts were maintained in molten condition at temperatures in the range of about 490° C. (where incipient solidification was observed) to 601° C., the average temperature being about 566° C.

Two graphite electrodes were immersed into the reaction mixture, initially at 496° C., and a direct current impressed across them from a circuit external to the reactor. The bath resistance measured was about 5 ohms and stayed steady at this value, rising slightly to about 5.5 ohms at the end of the run.

For the preponderance of the run the voltage across the electrodes was maintained at 4–6.5 volts, although for several very short periods this voltage was raised to as high as 100 volts to check if bath resistance would change.

Chlorine gas evolved steadily from the anode electrode region throughout the run. At the end of the run of 105 minutes a portion of the fused bath, supporting carbon pellets, was withdrawn from the cathode region; this portion was treated with liquid water when cool and it yielded acetylene gas. The remaining water extract was strongly alkaline.

I claim:
1. In a process for the electrolytic production of elemental chlorine from sodium chloride in an electrolytic decomposition zone having an anode region and a cathode region, the improvement which comprises: electrolyzing fused sodium chloride in the presence of particulate active carbon at a temperature not substantially above about 900° C.
2. The process of claim 1 wherein the preponderance of said carbon is in the size range from 4–60 mesh.
3. The process of claim 1 wherein the temperature is maintained between about 450° C. and 800° C.
4. The process of claim 1 wherein said carbon is maintained in the cathode region.
5. The process of claim 1 wherein carbon associated with sodium from the decomposition of sodium chloride is withdrawn from the cathode region and treated extraneously with water for generating caustic soda and acetylene.

References Cited in the file of this patent
UNITED STATES PATENTS

| | | |
|---|---|---|
| 649,565 | Acker | May 15, 1900 |
| 2,968,599 | Olstowski | Jan. 17, 1961 |